(12) United States Patent
Shafer

(10) Patent No.: US 8,146,258 B2
(45) Date of Patent: Apr. 3, 2012

(54) SAW COMPRISING MOVABLE GUIDE

(76) Inventor: Paul Shafer, Liverpool, NY (US)

( * ) Notice: Subject to any disclaimer, the term of this patent is extended or adjusted under 35 U.S.C. 154(b) by 296 days.

(21) Appl. No.: 11/824,370

(22) Filed: Jun. 29, 2007

(65) Prior Publication Data
US 2009/0000131 A1    Jan. 1, 2009

(51) Int. Cl.
B23D 49/00    (2006.01)
(52) U.S. Cl. ........................................... 30/371; 30/392
(58) Field of Classification Search .................. 30/371, 30/392–394; 606/177; 83/788
See application file for complete search history.

(56) References Cited

U.S. PATENT DOCUMENTS

| | | | | |
|---|---|---|---|---|
| 1,592,999 A * | 7/1926 | Williams | ........................ | 30/372 |
| 1,626,503 A * | 4/1927 | Bjorklund | ...................... | 30/392 |
| 1,704,641 A * | 3/1929 | Weed | .............................. | 30/392 |
| 1,855,371 A * | 4/1932 | Ungar | ............................ | 30/376 |
| 1,972,453 A * | 9/1934 | Lobdell | .......................... | 83/743 |
| 2,018,908 A * | 10/1935 | Allen | .............................. | 30/371 |
| 2,206,614 A * | 7/1940 | O'Hern | .......................... | 30/392 |
| 2,301,737 A | 11/1942 | Miller | | |
| 2,563,264 A * | 8/1951 | Norgard | ......................... | 30/371 |
| 2,588,477 A * | 3/1952 | Briggs | ............................ | 30/392 |
| 2,619,721 A * | 12/1952 | King | ................................ | 30/371 |
| 2,636,524 A | 4/1953 | Leckington | | |
| 2,639,737 A * | 5/1953 | Forsberg | ........................ | 30/392 |
| 2,668,567 A * | 2/1954 | Olson | ............................ | 30/392 |
| 2,722,244 A * | 11/1955 | Schultz | .......................... | 30/394 |
| 2,747,622 A | 5/1956 | Saye | | |
| 2,776,680 A * | 1/1957 | Waddell | ......................... | 83/169 |
| 3,461,732 A * | 8/1969 | Gregory | ........................... | 74/60 |
| 3,585,719 A * | 6/1971 | Kivela | ............................ | 30/392 |
| 3,740,845 A | 6/1973 | Klein | | |
| 3,748,738 A * | 7/1973 | Alexander | ...................... | 30/394 |
| 3,785,053 A * | 1/1974 | Michaelson | ................... | 30/394 |
| 3,805,383 A | 4/1974 | McNally | | |
| 3,834,019 A | 9/1974 | Smeltzer et al. | | |
| 3,876,015 A | 4/1975 | Kivela | | |
| 4,747,212 A | 5/1988 | Cavdek | | |
| 4,922,616 A | 5/1990 | Bensel | | |
| 5,269,064 A * | 12/1993 | Greene et al. | ................... | 30/382 |
| 5,561,909 A * | 10/1996 | Berg et al. | ....................... | 30/392 |

(Continued)

FOREIGN PATENT DOCUMENTS

DE    7442904    8/1975

(Continued)

OTHER PUBLICATIONS

Magrab, Edward B. Integrated Product and Process Design and Development (IP2D2). CRC PRess © 1997. Boca Raton. p. 144.*

*Primary Examiner* — Sean Michalski
(74) *Attorney, Agent, or Firm* — Heslin Rothenberg Farley & Mesiti P.C.

(57) ABSTRACT

A saw can include a guide for guiding a saw blade. In one embodiment, the guide can be moveable between an active position wherein the guide guides a saw blade and an inactive position wherein the guide does not guide the saw blade. In one embodiment, the guide in the active position limits lateral movement of the blade, and the guide defines a clearance between the guide and the blade, the clearance having a height greater than a height of the blade, the saw being configured so that during cutting at least a portion of the article being cut can be accommodated within the clearance without contacting the guide.

38 Claims, 8 Drawing Sheets

U.S. PATENT DOCUMENTS

| | | | |
|---|---|---|---|
| 5,595,250 A * | 1/1997 | Bourke | 173/29 |
| 5,611,146 A | 3/1997 | Ducret | |
| 5,644,847 A * | 7/1997 | Odendahl et al. | 30/394 |
| 5,688,279 A * | 11/1997 | McNulty et al. | 606/88 |
| 5,806,187 A | 9/1998 | Ducret | |
| 6,006,435 A * | 12/1999 | Chien | 30/392 |
| 6,067,716 A * | 5/2000 | Carter | 30/92 |
| 6,308,423 B1 * | 10/2001 | Ono | 30/377 |
| 6,317,988 B1 * | 11/2001 | Tachibana et al. | 30/376 |
| 6,550,147 B1 | 4/2003 | Fishlock et al. | |
| 6,658,745 B1 * | 12/2003 | Huang | 30/392 |
| 6,742,266 B2 * | 6/2004 | Splane, Jr. | 30/392 |
| 6,920,694 B2 * | 7/2005 | Hecht et al. | 30/392 |
| 7,065,884 B2 * | 6/2006 | Tam et al. | 30/376 |
| 2003/0047053 A1 | 3/2003 | Nakamura | |

FOREIGN PATENT DOCUMENTS

| | | |
|---|---|---|
| EP | 211182 A2 | 2/1987 |
| EP | 211182 A3 | 6/1987 |

* cited by examiner

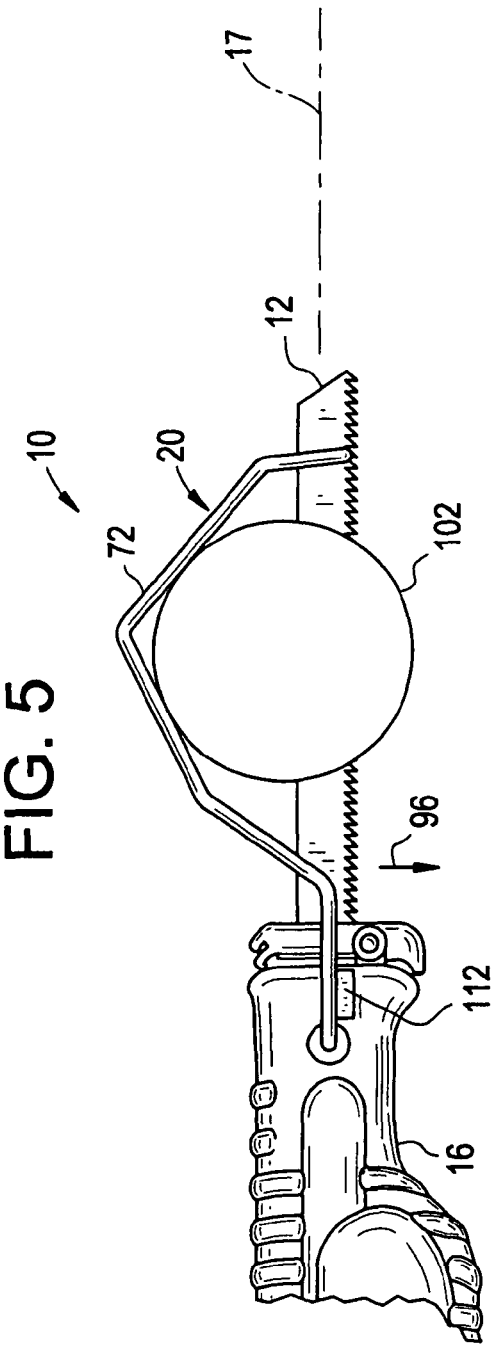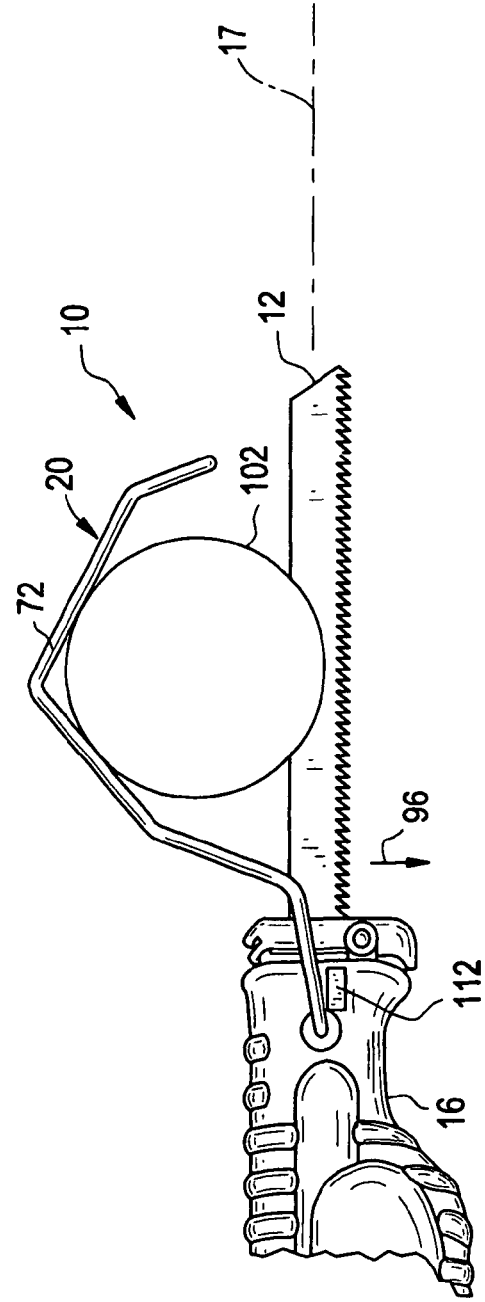

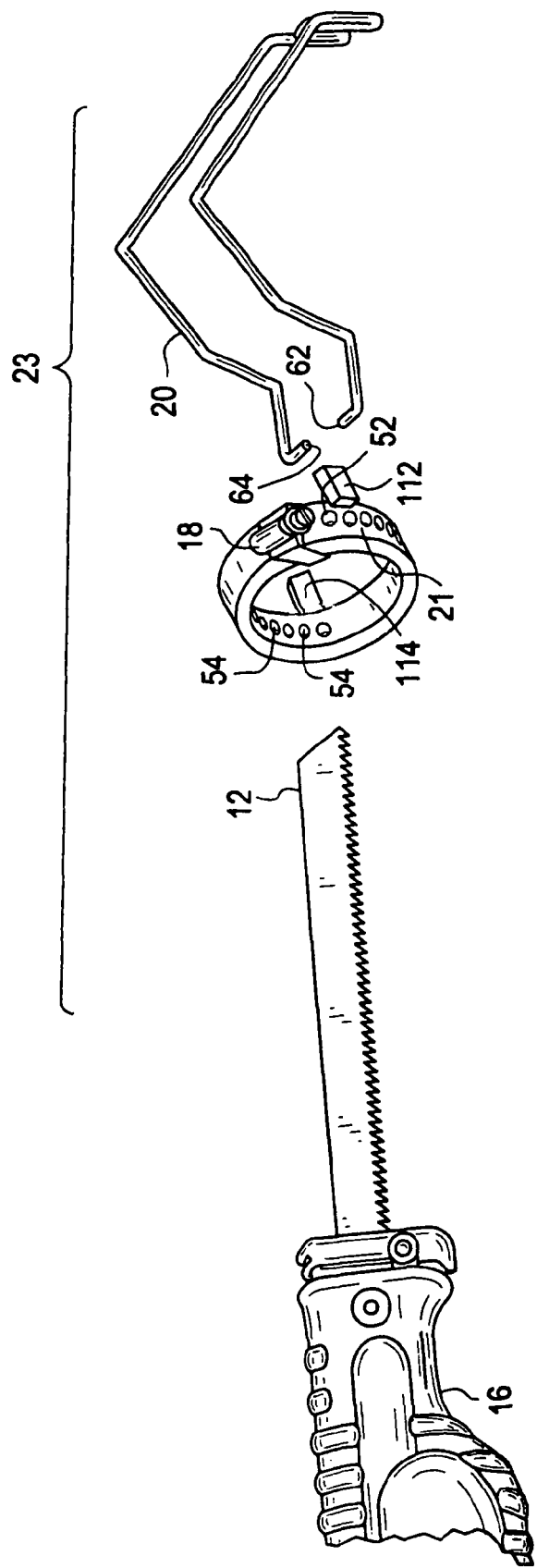

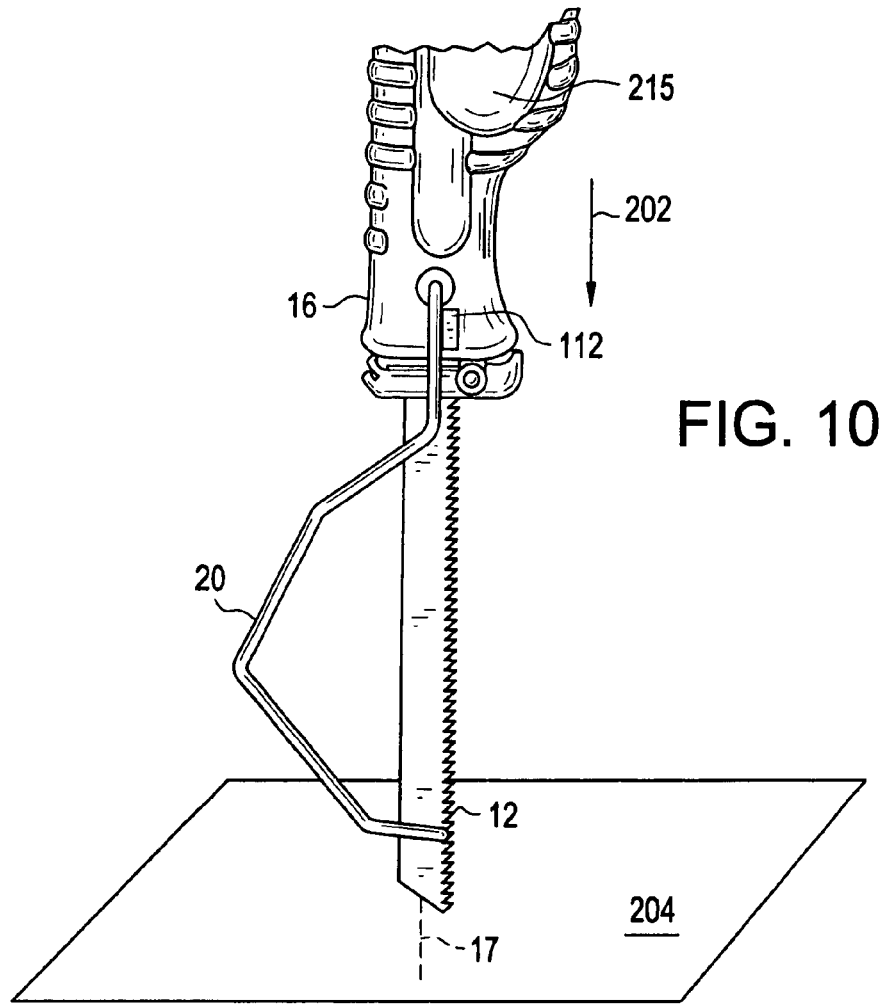
FIG. 10
FIG. 11
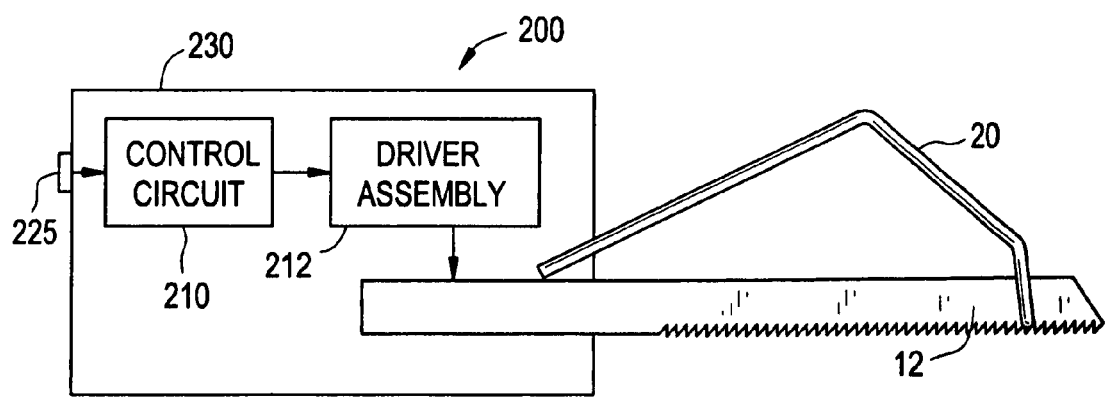

SAW COMPRISING MOVABLE GUIDE

FIELD OF THE INVENTION

The invention is related generally to an apparatus for cutting; and in particular, to a saw.

BACKGROUND OF THE PRIOR ART

Saws are available in a number of varieties. Hand saws are generally characterized by a saw blade mounted to a saw handle. Hand saws require manual movement by a saw operator for cutting. For cutting, an operator of a hand saw can grip the saw handle and manually drag a saw back and forth across an article to be cut perpendicularly with respect to a direction of a cut (if a direction of a cut is vertically down, a hand saw may be moved back and forth along a horizontal axis for cutting). There are a number of categories of hand saws including cross cut saws for cutting perpendicularly with respect to a grain of wood and rip saws for cutting along a grain of wood.

Mechanically powered saws are available in a number of categories. Circular saws are generally characterized by a circular blade, a motor for moving the blade about an axis, and a housing for housing the motor. In use, a circular saw can be moved by an operator in a direction of a cut. Alternatively, an article to be cut can be moved toward the circular cutting blade. Reciprocating saws are generally characterized by an elongated saw blade, a motor for moving the saw blade, and a housing for housing the motor. Reciprocating saws generally replicate the cutting motion of a hand saw by reciprocating a saw blade along an axis that is generally coextensive with the axis of the blade and generally perpendicular to a cutting direction. For cutting in a vertically downward cutting direction, a reciprocating saw may be stabilized in a horizontal position and allowed to fall by the force of gravity in the direction of the cut. For cutting in another cutting direction, an operator holding the saw housing may move the saw in a direction generally perpendicular to the axis of the saw blade.

BRIEF DESCRIPTION OF THE DRAWINGS

The preferred embodiment of the invention will now be described, by way of example only, with reference to the accompanying figures wherein like members bear like reference numerals and wherein:

FIGS. 5 and 6 are side views of a saw where the guide of a saw is capable of moving from an active position when encountering forces imparted by an article being cut.

FIG. 7 is a perspective assembly view of a saw having an after manufacture added guide assembly.

FIG. 10 is a perspective view of a guide equipped saw being used to plunge cut.

FIG. 11 is a schematic view of a guide equipped saw.

DETAILED DESCRIPTION OF THE INVENTION

Figure 1:
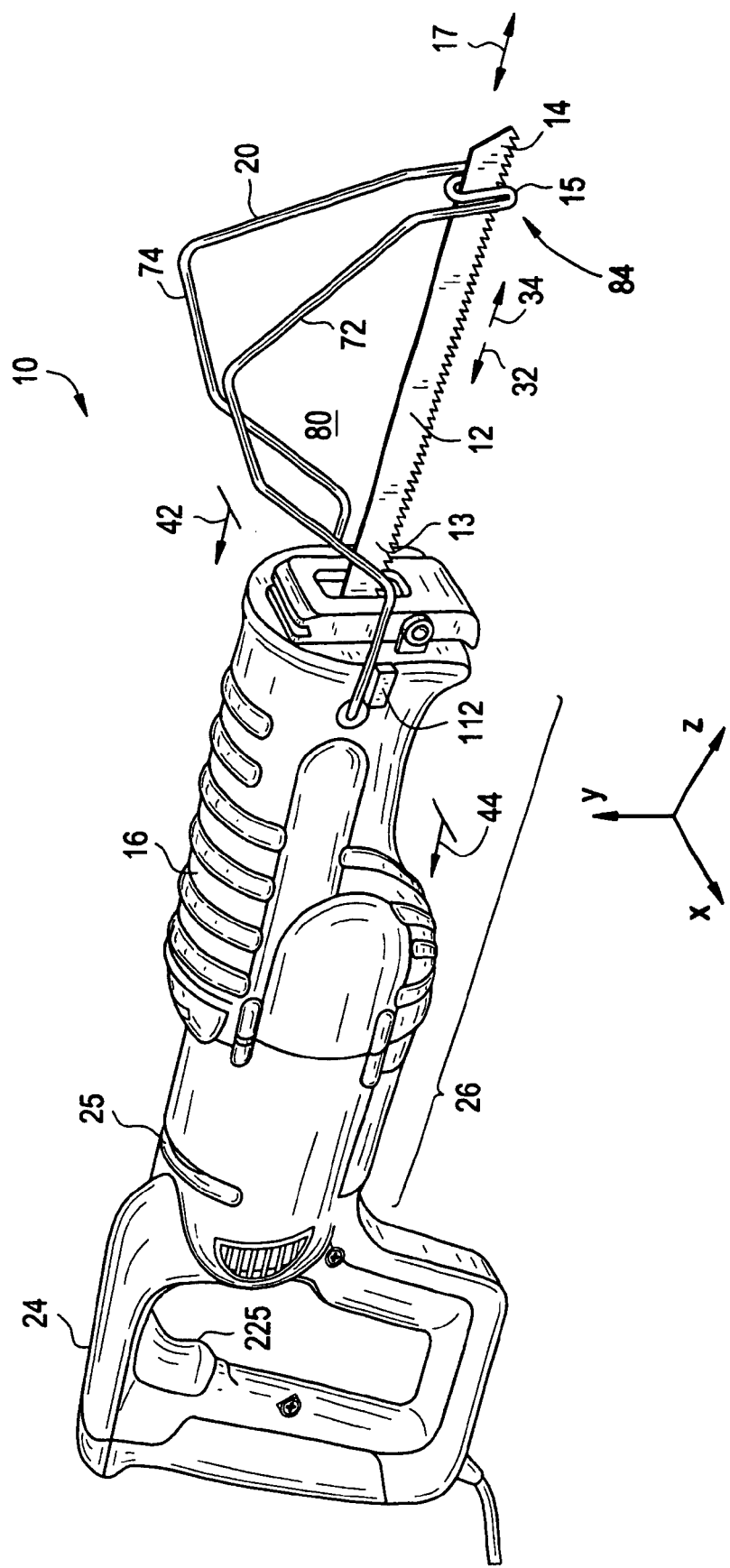
FIG. 1 is a perspective view of a saw having a moveable saw guide shown in an active position wherein the saw guide stops extensive motion of the saw blade.
Figure 2:
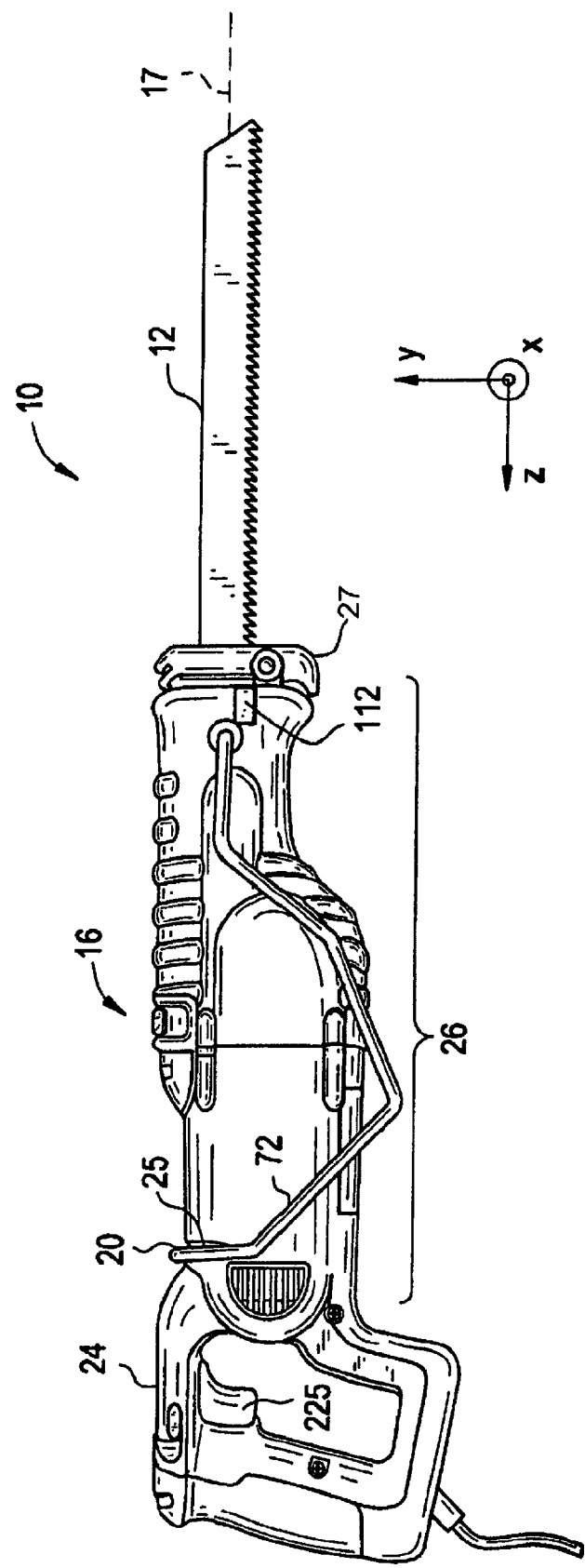
FIG. 2 is a side view of the saw as shown in FIG. 1, showing the saw guide in an inactive position.
Figure 3:
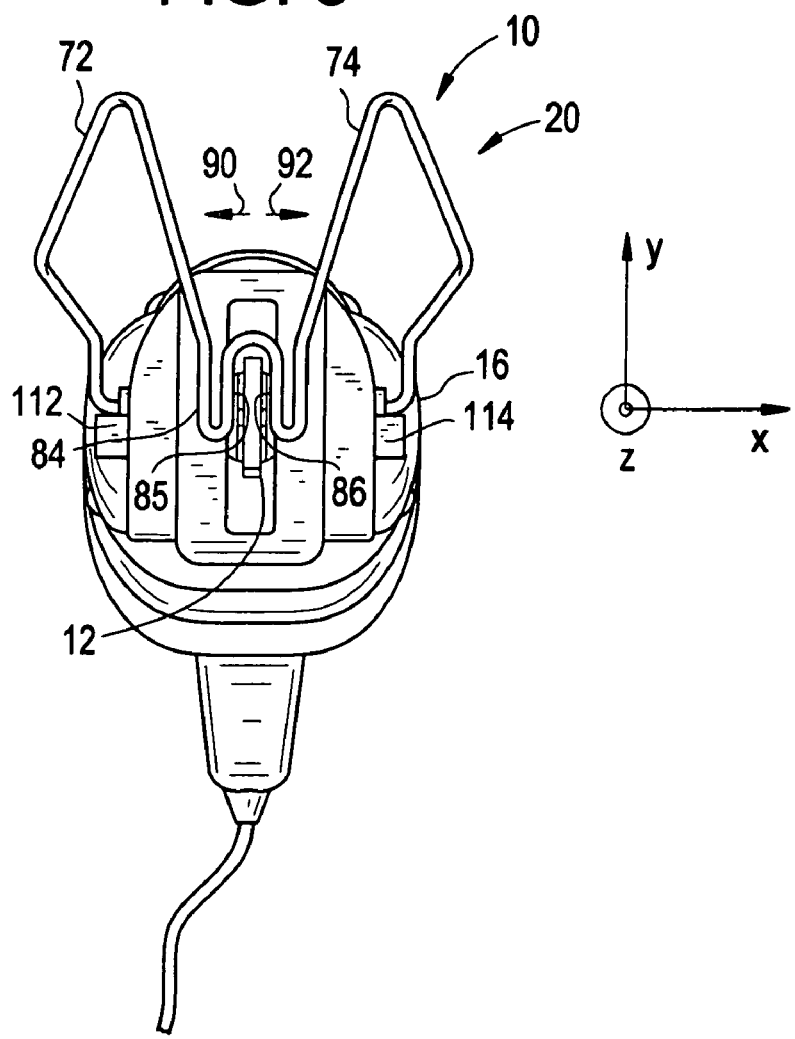
FIG. 3 is a front view of the saw as shown in FIG. 1, with the saw guide in an active position.

An exemplary saw is shown in FIGS. 1, 2, and 3. Saw 10, in one particular embodiment, can include saw blade 12, housing 16, and guide 20. In one embodiment, saw blade 12 can be reciprocated back and forth generally in the direction of arrows 32 and 34 by way of forces supplied by a saw driver assembly (e.g., motor) to be described later herein in connection with FIG. 11. Where saw 10 incorporates a saw blade that is reciprocated back and forth saw 10 can be regarded as a reciprocating saw. Housing 16, in the embodiment of FIGS. 1, 2, and 3 can include a handle portion 24 and a main body 26. Saw 10 can also include guard 27. Among other functions, guard 27 can provide spacing between saw blade 12 and housing 16. In the embodiment of saw 10 as shown in FIG. 1, housing 16 extends in a direction generally co-extensive with housing 16.

In one aspect, saw 10 can include a guide 20 for guiding saw blade 12. Guide 20 can be moveable between an active position and an inactive position. In an active position, in one embodiment the guide serves to guide a saw blade, limiting movement of the blade. In an inactive position, in one embodiment the guide does not serve to guide a saw blade, and does not serve to limit movement of the blade.

Configured as described, guide 20 provides significant advantages. When guide 20 is in an inactive position, saw 10 is optimized for certain applications such as demolition applications wherein saw 10 can be used to destroy structures such as walls, floors, piping infrastructure, and the like. Positioning guide 20 into an inactive position is also useful in demolition applications and in applications other than demolition applications where it is desired to increase an active cutting surface area of saw blade 12. When guide 20 is in the active position to guide saw blade 12, saw 10 is optimized for precision cutting applications wherein saw 10 can be used to make precise cuts on articles without substantial concern that saw blade 12 will become deformed during cutting operations. It will be seen that saw 10 can also be used for demolition activities when guide 20 is in an active position.

In FIGS. 1 and 3 herein, guide 20 is shown in an active position, whereas in FIG. 2, guide 20 is shown in an inactive position. Saw 10 can be configured so that guide 20 is moveable between an active and inactive position. In the embodiment of FIGS. 1-3, guide 20 is pivotally moveable between an active and inactive position. Saw 10 can also or in the alternative be configured so that guide 20 is detachably moveable between an active and inactive position. That is, saw 10 can be configured so that an active position of guide 20 is achieved by attaching guide 20 to a body of saw 10 (e.g., housing main body 26) in such position that guide 20 guides saw blade 12 and further, so that an inactive position of guide 20 is achieved by removing and separating guide 20 from the remainder of the saw. The saw body onto which guide 20 is attached can be a saw body that remains in a fixed position relative to saw blade 12 in which saw blade 12 is being driven by a driver assembly. For example, while guide 20 is shown through several views as being mounted to housing 16, saw 10 can readily be adapted so that guide 20 can be mounted to guard 27 of saw 10. In one embodiment, the saw body can be adaptively attached to a housing 16. Saw 10 can be configured so that whether guide 20 can be moved without removal thereof to achieve an inactive position (e.g., pivoted from an active position) or whether it can be detached from a remainder of saw 10, guide 20 can be manually moved by a saw operator to achieve an inactive position. In a specific embodiment, saw 10 can be configured so that guide 20 can be manually moved by a saw operator to achieve an inactive position at a time which driver assembly 212 moves saw blade 12.

Figure 4:
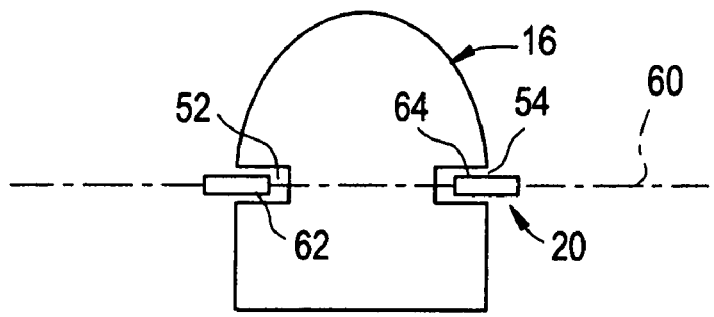
FIG. 4 is a cutaway front view of a saw as shown in FIG. 1.

In the specific embodiment of FIGS. 1, 2, and 3, saw 10 can be configured so that guide 20 is pivotally moveable between an active and inactive position. For providing pivotal movement of guide 20, guide 20 can be arranged with respect to a body of saw 10 as is shown and described in FIG. 4, showing a cutaway front view looking in the direction of arrows 42 and 44 of FIG. 1. As shown in FIG. 4, housing 16 can have formed therein axially aligned pin holes 52 and 54 aligned along axis 60, and guide 20 can be shaped as shown to include axially aligned pins 62 and 64. Guide 20 and housing 16 can be complementarily formed so that guide 20 is received in pin holes 52 and 54. When received in the pin holes 52 and 54, the axle defined by the pair of pins 62 and 64 can pivot about axis 60 defined by the pair of pin holes 52 and 54. Guide 20, which can be spring loaded so as to be mounted in pin holes 52 and 54, can be manually removed from pin holes 52 and 54. Accordingly, in the embodiment of FIGS. 1-3, guide 20 can be moved from an active position either by pivoting the guide away from an active position or by removing the entire guide 20 from pin holes 52 and 54. In the embodiment described, guide 20 can be manually moved from an active position by an operator while saw blade 12 is being driven by driver assembly 212 (FIG. 11) without removing saw blade 12 and without disassembly of any component of saw 10.

Further aspects of guide 20 in a particular embodiment, are now described. In the particular embodiment of FIGS. 1-3, guide 20 has a pair of arms 72 and 74 extending from each respective pin 62 and 64. When guide 20 is in an active position, guide 20 can have the characteristics as best seen in FIG. 1. Namely, arms 72 and 74 can be shaped to define a clearance 80 between arms 72 and 74 and saw blade 12. Further, as best seen in FIG. 1, arms 72 and 74, at a distal end of arms 72 and 74 terminate at blade limiting assembly 84. Blade limiting assembly 84 of guide 20 can be configured to limit movement of saw blade 12. As best seen in the view of FIG. 3, blade limiting assembly 84 has guide surfaces 85 and 86 which limit movement of blade 12 in the direction of arrows 90 and 92 (in the lateral direction). Accordingly, blade limiting assembly 84 prevents deformation of the saw blade 12 which would otherwise occur by the lateral bending of saw blade 12 in the direction of arrows 90 and 92. In a further aspect, saw blade 12 can be regarded as having a proximal end 13 and a distal end 14 as shown in FIG. 1. In one embodiment, saw 10 can be configured so that blade limiting assembly 84, when guide 20 is in an active position, surrounds saw blade 12 at a position of saw blade 12 that is more proximate distal end 14 than proximal end 13. Configuring saw 10 so that blade limiting assembly 84 surrounds blade 12 at a position more proximate to distal end 14 than proximal end 13 enhances the capacity of guide 20 to reduce stresses and wear on saw blade 12 which can be expected to be incurred through cutting. It can be seen that guide 20 would be comparatively less effective in reducing stresses incurred near distal end 14 of blade 12 by use of the cutting surface near distal end 14 if guide 20 were configured so that blade limiting assembly 84 surrounded blade 12 more proximate to proximal end 13 than distal end 14. Nevertheless, in certain applications, such a configuration can be useful.

In the specific example of FIGS. 1-3, a major cutting surface of blade 12 is defined between point 15 where guide 20 surrounds blade 12 and proximal end 13 of blade 12. A minor cutting surface of blade 12 is defined between point 15 where guide 20 surrounds blade 12 and distal end 14 of blade 12. With guide 20 in an active position both the major cutting surface and the minor cutting surface can be utilized. The major cutting surface might be utilized for precision cutting of articles, e.g., pipes while limiting stresses imposed on blade 12 while the minor cutting surface can be utilized e.g., for initiating a plunge cut as will be described herein while imposing minimal stresses on blade 12.

Where saw blade 10 is configured so that guide 20 can be moved into an inactive position without removing guide 20 from a saw body, a saw body can be adapted so that a saw body accommodates at least a portion of guide 20 when guide 20 is in an inactive position. For example, as shown in FIGS. 1 and 2, housing 16 includes a formation 25 (shown as being provided by a recess) shaped to accommodate arms 72 and 74 and blade limiting assembly 84 when guide 20 is in an inactive position. As shown in FIG. 2, guide 20 and housing 16 can be complementarily configured so that guide 20 is received into a guide receiving formation 25 of housing 16 when guide 20 is in an inactive position.

In still another aspect, saw 10 can be configured so that when guide 20 opposes a force imposed by an article being cut, guide 20 is capable of moving from the active position as shown in FIG. 1. As illustrated in FIGS. 5 and 6, saw 10 can be configured so that when being used to cut in the direction of arrow 96, and when guide 20 contacts article 102 being cut (e.g., a pipe), as shown in FIG. 5, guide 20 can move from the active position as shown in FIG. 5 to an inactive position as shown in FIG. 6. By configuring guide 20 so that guide 20 can move from an active position when encountering forces imposed by an article being cut, guide 20 does not interfere with the cutting of article 102. It can be seen that if guide 20 were fixedly secured to saw body 10 (e.g., housing 16 or guard 27) such that guide 20 did not move when encountering forces imposed by article 102 being cut, guide 20 would, in effect, limit the diameter of the article which is capable of being cut using saw 10.

In a simplified embodiment, guide 20 can be pivotally mounted in pin holes 52 and 54 so as to allow substantially free pivoting of guide 20 about axis 60. Further, on housing 16, there can be provided stops 112 and 114 for locating an active position of guide 20. That is, guide 20 can be pivoted from an inactive position as shown in FIG. 2 to an active position until arms 72 and 74 contact stops 112 and 114 so as to provide feedback to a saw operator that an active position is achieved. Provided that saw 10 is held in the orientation shown wherein gravity will maintain the contacting relationship between arms 72 and 74 and stops 112 and 114, guide 20 will remain in an active position. However, as blade 12 is moved downwardly in the performance of a cut to the point where article 102 contacts arms 72 and 74 (FIG. 5), guide 20 will be permitted to pivot away from the active position as shown in FIG. 6 so as not to interfere with the cutting of article 102.

In another embodiment, saw 10 is configured so that friction forces can maintain guide 20 at a certain angular relationship relative to saw blade axis 17. In such manner while stops 112 and 114 continue to perform the function of aiding an operator in locating an active position, guide 20 can remain in an active position to limit movement of blade 12 even when saw 10 is moved into an orientation different from the horizontal orientation depicted in FIGS. 1, 2, and 3. For example, guide 20 can be mounted to housing 16 or another saw body, e.g., guard 27 in such a manner that guide 20 can be pivoted by application of modest forces of the variety that can be applied manually by an adult human of average strength but also can be mounted in such a manner that guide 20 maintains its current angle relative to saw blade axis 17 as saw 10 is moved between various orientations, (e.g., vertically, upside down, diagonally). For mounting guide 20 to housing 16 in such a manner that guide 20 (a) can be easily pivoted by human applied forces, (b) can move from an active position when encountering forces imparted by an article being cut, and yet (c) can maintain a certain angular relationship with saw blade axis 17 when moved between various orientations, guide 20 and housing 16 can be complementarily configured so that friction forces between guide 20 and housing 16 or another saw body allow such functional characteristics (human actuated pivoting, movement from an active position when encountering article being cut, maintaining angle between guide and saw blade axis) to be satisfied.

In one example, holes 52 and 54 and pins 62 and 64 can be complementarily configured so that holes 52 and 54 impose such frictional forces on pins 62 and 64 as to allow the identified functional characteristics to be satisfied. In another example, arms 72 and 74 and the body onto which the arms are attached (housing 16 in the embodiments of FIGS. 1-3) can be complementarily configured so that arms 72 and 74 are normally biased inward so that arms 72 and 74 impose a spring force on housing 16 when guide 20 is mounted to housing 16. Frictional forces between arms 72 and 74 and housing 16 can be increased to a desired intensity by forming a texture on housing 16 in an area where housing 16 contacts arms 72 and 74. Frictional forces between arms 72 and 74 and housing 16 can be eliminated if desired by sizing guide 20 so that arms 72 and 74 do not contact housing 16.

In one embodiment, saw 10 can be manufactured by a manufacturer to include a body specifically adapted to receive guide 20. For example, housing 16 as indicated in the views of FIGS. 1-6, can be manufactured to include pin holes 52 and 54 that receive guide 20. The combination of guide 20 and holes 52 and 54 in the embodiment of FIGS. 1-6 can be regarded as a guide assembly.

In another embodiment, saw 10 is not specially manufactured to include guide 20 and guide 20 can be provided as an add-on unit which can be added on to a saw that does not include a guide at the time of completion of manufacture. In one specific embodiment, guide 20 can operate in association with an adapter that adapts saw 10 so that guide 20 can be attached to a saw that does not include guide 20 at the time of manufacture in the formation of a modified saw. In one example, an adapter can be sized and shaped to allow a guide to be attached to a specific type (e.g., a specific manufacturer model) of saw. In another example, an adapter can be sized and shaped to allow a guide to be attached to a wide variety of types of saws (e.g., a variety of manufacturer models).

Figure 8:
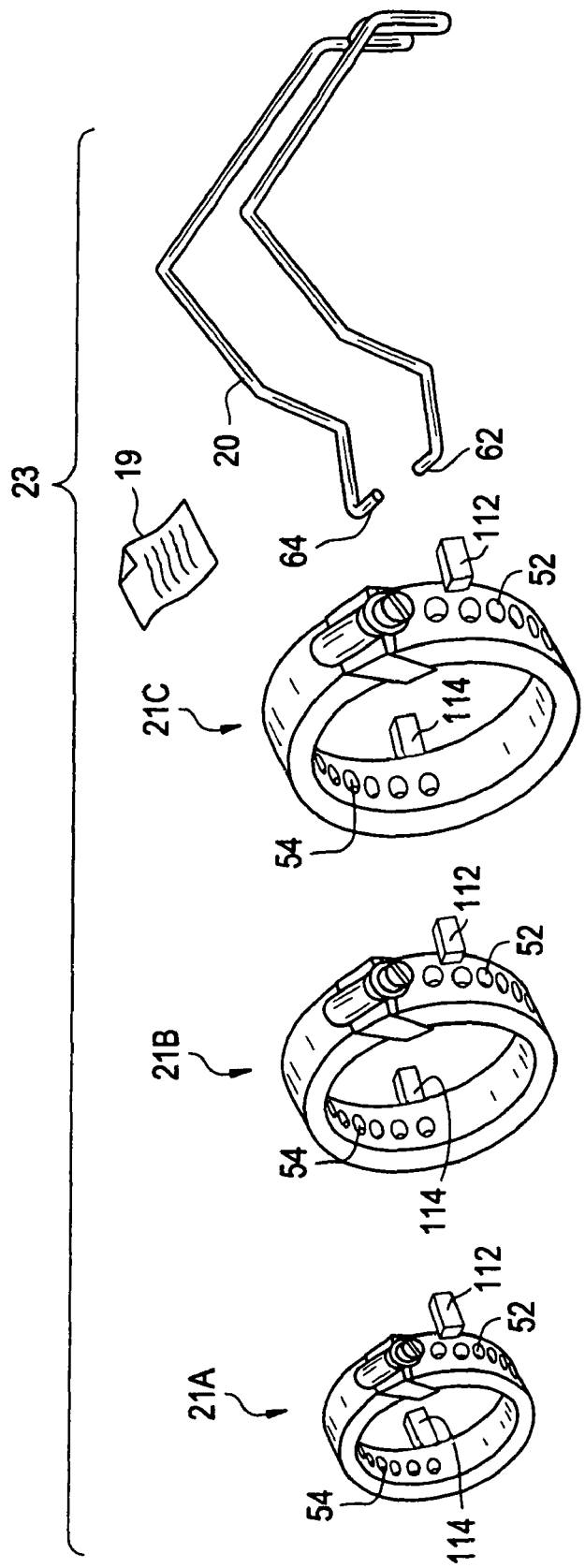
FIG. 8 is a perspective view of a kit comprising an after manufacture guide assembly.
Figure 9:
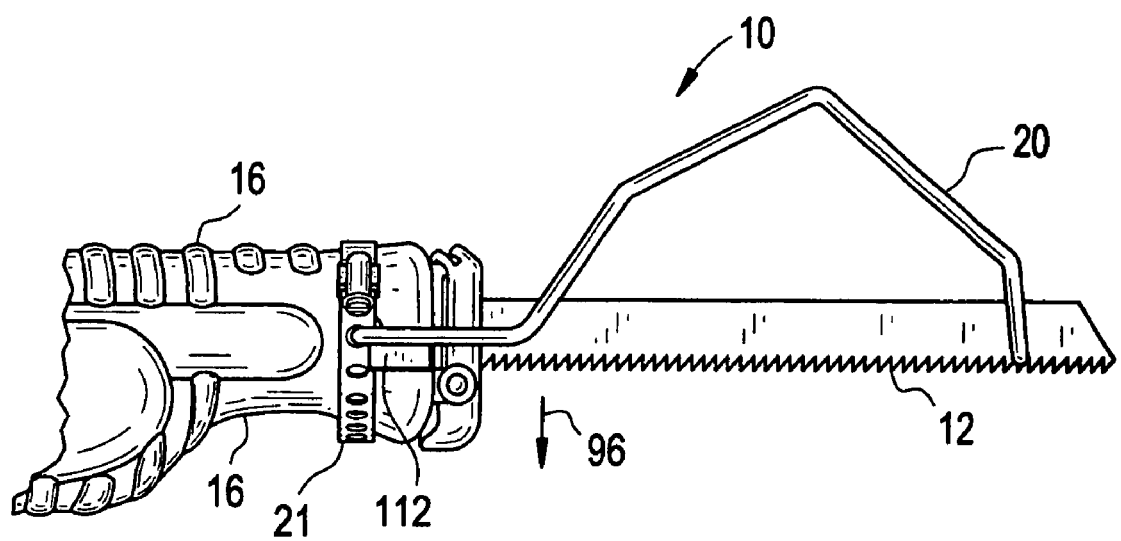
FIG. 9 is a side view of an assembled saw having an after manufacture guide assembly.

An embodiment of a guide 20 operating in association with an adapter 21 is shown and described in connection with FIGS. 7-9. In the embodiment of FIGS. 1-6, guide 20 can be mounted to a saw body without use of an adapter. In the embodiment of FIGS. 7-9, guide 20 can be mounted to a saw body with use of an adapter. In the embodiments of FIGS. 7-9, the combination of a guide and an adapter form an apparatus that can be attached to a fully manufactured commercially available saw in the formation of a modified saw. Referring to FIG. 7, guide 20 can operate in association with an adapter 21. Adapter 21 can be configured to be attached to a saw body after saw 10 is manufactured in the formation of a modified saw. Conveniently, adapter 21 can be adapted to be fitted to a housing 16. However, in another embodiment adapter 21 can be configured to be attached to a saw body other than housing 16, e.g., guard 27. In the embodiment of FIG. 7, adapter 21 has hose clamping hardware 18 for securing adapter 21 to a saw body. Adapter 21 in the embodiment of FIG. 7 is configured to be fitted on numerous varieties of housings of alternative shapes and sizes. Referring to the embodiment of FIG. 7, adapter 21 can first be mounted (e.g., by clamping) onto a saw body (e.g., housing 16) and then pins 62 and 64 of guide 20 can be inserted into pin holes 52 and 54 of adapter 21. It will be seen that adapter 21 can be provided with a plurality of pin holes 52 and 54. Adapter 21 can be expected to be adjusted to a variety of different diameters depending on the diameter of the saw body onto which it is attached. Providing a plurality of pin holes 52 and 54 assures that a pair of pin holes will be substantially axially aligned when adapter 21 is attached to a saw body. In another aspect adapter 21 can include stops 112, 114 functioning in the manner of the stops 112, 114 described with reference to FIGS. 1-6. Adapter 21 can be configured so that stops 112, 114 are detachably attachable to the remainder of adapter 21. Providing stops 112, 114 so that their location can be adjusted allows the stops to be properly positioned no matter which set of pin holes 52 and 54 guide 20 is fitted into. In one embodiment, stops 112, 114 can be provided in the form of spring loaded clips which can be clipped onto a remainder of adapter 21. In another embodiment, stops 112, 114 can be screw mounted on a remainder of adapter 21. In the embodiment of FIG. 7, a guide assembly can be regarded as including adapter 21, holes 52 and 54 and guide 20.

Another embodiment of a guide 20 is shown and described with reference to FIG. 8. In the embodiment of FIG. 8, the described guide 20 is provided as part of a kit 23 comprising a plurality of candidate adapters 21a, 21b, and 21c and a guide 20. A saw operator selects a certain adapter 21a, 21b, or 21c depending on the type of saw that the adapter is to be mounted to. The guide of FIG. 8 can be sold in the form shown in FIG. 8. For example, in a single product package there can be provided a single guide 20, and a plurality of adapters 21a, 21b, and 21c. Alternatively, guide 20 and adapters 21a, 21b, and 21c can be sold separately. In an on-line or physical retail store there can be provided a chart 19 indicating an appropriate adapter model number that is associated with each of several particular saw types (typically designated by manufacturer and model number). A saw operator, by referencing chart 19 can purchase a guide and one particular adapter that is particularly suited for the particular saw that the operator intends to attach a guide to. Adapters 21a, 21b, and 21c of kit 23 can each include stops 112, 114 as described previously herein. Where kit 23 is provided in a form where a single product package includes a plurality of adapters and a single guide 20, chart 19 correlating saw types with adapters 21a, 21b, and 21c can be provided in the product package including the adapters and the guide. Where kit 23 is provided in a form where an operator normally purchases a guide and a particular one adapter separately, chart 19 correlating saw types and adapters can be in the form of a physical substrate (e.g., paper) carrying printed matter. Chart 19 can also be made available electronically. In one example, chart 19 can be encoded in an HTML webpage and can be accessible by an operator with use of a browser equipped personal computer by storing the HTML web page in a particular server and by providing the operator with a Universal Resource Locator (URL) for the particular server.

In FIG. 9 there is shown a saw 10 having an after market add-on guide 20. Guide 20 in the embodiment of FIG. 9 is constructed as described in the embodiments of FIGS. 7 and 8 and can operate in association with an adapter 21 which is attached to a saw body (housing 16 in the example shown). Once fitted, attached to a saw body, and assembled, guide 20 can be pivoted between active and inactive positions as have been described herein. Examples of commercially available manufactured saws onto which an adapter and a guide can be attached include a model # DW304P saw available from DEWALT, a model # RJ162P saw available from RYOBI, a model # R3000 saw available from RIGID, and a model # 6509-22 saw available from MILWAUKEE.

It has been mentioned that when guide 20 is in the active position, saw 10 is particularly well suited for use in precision cutting applications while moving guide 20 into inactive position renders saw 10 particularly well suited for use in demolition applications.

It should be mentioned that positioning guide 20 in an active position can yield advantages when saw 10 is utilized in demolition applications. In addition to facilitating precision cuts, guide 20 by limiting movement of blade 12, can prevent damage to blade 12, allowing blade 12 to remain straight over extended periods of use. Saws of the form factor as described herein having saw blade 12 extending generally coextensively with a saw housing are often used for demolition applications (e.g., ripping apart walls, floors or ceilings). In a demolition application described with reference to FIG. 9 it is common to use a saw of the form factor of FIG. 10 in a "plunge cut." When making a plunge cut, saw 10 is driven into a surface being cut by moving the saw generally in the direction of the saw axis 17 (i.e., in the direction of arrow 202 in FIG. 10). A problem with the commonly executed plunge cut noted by the inventor is that plunge cutting exposes a saw blade 12 to a high risk of being excessively bended and hence damaged. Typically, when tip 14 contacts surface 204 with substantial force saw blade 12 bends significantly.

The inventor noted that it is particularly useful to position guide 20 in an active position when initiating plunge cutting. For initiating plunge cutting, guide 20 can be manually moved into an active position. Then, after an initial cut is made via the plunge cut, guide 20 can be manually moved by an operator into an inactive position to expose a larger useful cutting surface of blade 12. Once an initial plunge cut has been successfully made, subsequent cuts can be made by moving saw 10 so that blade 12 moves in a direction generally perpendicular to the axis 17 of the blade (i.e., in the direction of arrow 96 as shown in FIG. 9). Such cuts perpendicular to the blade axis are not as stressful on a blade 12 as plunge cuts and hence can be made with guide 20 in an inactive position with reduced risk of saw blade 12 being substantially deformed through cutting.

A functional schematic diagram of saw 10 is described with reference to FIG. 11. In one embodiment, saw 10 can include a control circuit 210, which can be microcontroller or microprocessor based. Control circuit 210 can be responsive to other input controls such as may be initiated by actuating trigger 225, shown in an exemplary physical formation in FIG. 1. Saw 10 can be configured so that when an operator actuates trigger 225 control signal 210 responsively sends a control signal to driver assembly 212 such as may be provided by a motor to drive saw blade 12. In one embodiment, saw blade 12 is configured to be a variable speed saw such that a speed of saw blade 12 varies depending upon the extent to which trigger 225 is depressed. Saw 10 can be configured so that driver assembly 212 ceases reciprocating saw blade 12 when trigger 225 is released. Elements within border 230 also shown in FIG. 11 are elements that can be disposed within housing 16 of saw 10.

A small sample of systems methods and apparatus that are described herein is as follows:

A1. A saw for cutting an article, said saw comprising:
 an elongated saw blade;
 a driver assembly for moving said saw blade;
 a housing encapsulating said driver assembly; and
 a guide for guiding said elongated saw blade, the saw being configured so that said guide is moveable between an active position and an inactive position, the guide in said active position limiting lateral movement of said saw guide, the guide in said inactive position not limiting lateral movement of said saw blade, wherein said saw is configured so that said guide, when encountering a force imparted by said article during cutting while said guide is in said active position, is capable of moving from said active position to permit continued cutting of said article after said article is contacted by said guide during cutting.

A2. The saw of claim A1, wherein said saw is configured so that said guide is pivotally moveable between said active position and said inactive position.

A3. The saw of claim A1, wherein said saw is configured so that said guide can be moved between said active position and said inactive position without detaching said guide from a body of said saw.

A4. The saw of claim A1, wherein said housing has a pair of openings sharing a common axis and wherein said guide includes a pair of opposing pins, the openings receiving said pins for pivotal mounting of said guide on said housing.

A5. The saw of claim A1, wherein said guide is pivotally arranged on said saw in such manner that an angle between said guide and an axis of said saw blade remains constant as said saw is moved between various orientations.

A6. The saw of claim A1, wherein said guide has a pair of arms terminating in a blade limiting assembly, the blade limiting assembly having a pair of surfaces limiting lateral movement of said saw blade when said guide is in said active position.

A7. The saw of claim A1, wherein said guide has a pair of arms extending to define a pair of arches and terminating in a blade limiting assembly, the blade limiting assembly having a pair of surfaces limiting lateral movement of said saw blade, when said guide is in said active position.

A8. The saw of claim A1, wherein said guide has a blade limiting assembly, wherein said blade has a proximal end and a distal end and wherein said saw is configured so that when said guide is in said active position said blade limiting assembly surrounds said blade at a position that is more proximate said distal end than said proximal end.

A9. The saw of claim A1, wherein said housing of said saw has a formation configured to accommodate said guide when said guide is in said inactive position.

A10. The saw of claim A1, wherein said guide is attached to a saw body provided by said housing.

A11. The saw of claim A1, wherein said guide is attached to a saw body with use of an adapter.

B1. A guide for guiding a saw blade, said guide comprising:
 a blade limiting assembly having a pair of opposing surfaces for limiting lateral movement of said saw blade;
 wherein said guide is configured to be mounted to a body of a saw; and
 wherein said guide is further configured so that said guide can be moved between an active position wherein said guide limiting assembly surrounds said saw blade to limit lateral movement of said saw blade and an inactive position wherein said blade limiting assembly does not limit lateral movement of said saw blade.

B2. The guide of claim B1, wherein said guide is configured to be mounted to a housing of a saw.

B3. The guide of claim B1, wherein said guide is adapted to be mounted to a guard of said saw.

C1. An apparatus for use in guiding a saw blade, said apparatus comprising:
 an adapter configured to be mounted on a saw body; and
 a guide, said guide configured to be moveable between an active position in which said guide limits movement of said saw blade, and an inactive position in which said guide does not limit movement of said saw blade, wherein said guide is configured to be mounted to said adapter, said apparatus being configured as an add on apparatus to be added to a saw after manufacture of a saw to form a modified saw, said guide being at least one of manually removable from or pivotally movable relative to said adapter when mounted on said adapter.

C2. The apparatus of claim C1, wherein said apparatus is configured so that said guide is pivotally mounted on said adapter.

C3. The apparatus of claim C1, wherein said adapter is configured to be mounted to a saw housing.

C4. The apparatus of claim C1, wherein said adapter is configured to be adjustably sizeable so as to facilitate mounting on a plurality of saws having varying sizes and shapes.

D1. A kit comprising:
a plurality of adapters, wherein each of said adapters is correlated with a different type of saw, each adapter being configured to be mounted to a saw body; and
a guide configured to be mounted on each of said adapters of said kit, said guide being at least one of manually removable from or pivotally movable relative to an adapter when mounted on an adapter.

D2. The kit of claim D1, wherein said kit further includes a chart indicating associations between adapters of said plurality of adapters and types of saws.

E1. A saw for cutting an article, said saw comprising:
an elongated saw blade;
a driver assembly for moving said saw blade;
a housing encapsulating said driver assembly; and
a guide for guiding said elongated saw blade, the saw being configured so that said guide is moveable between an active position and an inactive position, the guide in said active position limiting lateral movement of said saw guide, the guide in said inactive position not limiting lateral movement of said saw blade, wherein said saw is configured so that said guide can be manually moved by an operator from said active position to said inactive position without removing said guide from saw.

E2. The saw of claim E1, wherein said saw is configured so that said guide is pivotally moveable between said active position and said inactive position.

E3. The saw of claim E1, wherein said saw is configured so that said guide is detachably moveable between said active position and said inactive position.

E4. The saw of claim E1, wherein said housing has a pair of holes sharing a common axis and wherein said guide includes a pair of opposing pins, the holes receiving said pins for pivotal mounting of said guide on said housing.

E5. The saw of claim E1, wherein said guide is pivotally arranged on said saw in such manner that an angle between said guide and an axis of said saw blade remains constant as said saw is moved between various orientations.

E6. The saw of claim E1, wherein said guide in said active position has a pair of arms extending from said housing and terminating in a blade limiting assembly, the blade limiting assembly having a pair of surfaces limiting lateral movement of said saw blade.

E7. The saw of claim E1, wherein said guide has a pair of arms extending to define a pair of arches and terminating in a blade limiting assembly, the blade limiting assembly having a pair of surfaces limiting lateral movement of said saw blade wherein said guide is in said active position.

E8. The saw of claim E1, wherein said guide has a blade limiting assembly, wherein said blade has a proximal end and a distal end and wherein said saw is configured so that when said guide is in said active position said blade limiting assembly surrounds said blade at a position that is more proximate said distal end than said proximal end.

F1. A method for cutting an article having a flat surface, said method comprising the steps of:
providing a hand held saw having a generally elongated housing and a reciprocating saw blade extending in a direction generally coextensively with said housing;
including on said saw a moveable guide moveable between an active position in which said saw limits lateral movement of said saw blade and an inactive position in which said guide does not limit lateral movement of said saw blade;
with said guide in said active position, initiating a cut into said flat surface of said article by way of contacting a distal end of said saw blade with said article;
thereafter, moving said guide from active position to said inactive position wherein said guide does not limit lateral movement of said saw blade; and
continuing to cut said flat surfaced article with said guide in said inactive position.

G1. A method for cutting an article, said method comprising the steps of:
providing a hand held saw having a generally elongated housing and a reciprocating saw blade extending in a direction generally coextensively with said housing;
including on said saw a moveable guide moveable between an active position in which said saw limits lateral movement of said saw blade and an inactive position in which said guide does not limit lateral movement of said saw blade, wherein said including step includes the step of configuring said guide so that said guide can move from said active position when said guide encounters forces imparted by said article while said article is being cut;
initiating a cut into said article by moving said saw in such manner that said saw blade moves in a direction generally perpendicularly to an axis of said saw blade while said article is being cut;
continuing cutting said article until said article contacts said guide; and
further continuing cutting of said article in such manner that contact of said guide by said article moves said guide from said active position.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems apparatuses and methods can be practiced with fewer than the mentioned certain number of elements.

I claim:

1. A saw for cutting an article, said saw comprising:
an elongated saw blade having a proximal end and a distal end;
a driver assembly for moving said elongated saw blade;
a housing encapsulating said driver assembly; and
a guide for guiding said elongated saw blade, the saw being
configured so that said guide is moveable between an active position and an inactive position, the guide in said active position limiting lateral movement of said elongated saw guide blade, the guide in said inactive position not limiting lateral movement of said elongated saw blade, wherein said saw is configured so that said guide, when encountering a force imparted by said article during cutting while said guide is in said active position, is capable of moving from said active position to permit continued cutting of said article after said article is contacted by said guide during cutting, wherein the guide includes a blade limiting assembly for limiting lateral movement of the elongated saw blade when the guide is in said active position, the blade limiting assembly surrounding the elongated saw blade at a position spaced from the housing when the guide is in said active position, wherein the blade limiting assembly includes first and second opposing members that are spaced to a lateral spacing distance greater than a width of the blade, wherein the guide defines a clearance between the guide and the elongated saw blade, the clearance having a height greater than a height of the elongated saw blade, the saw being configured so that during cutting at least a portion of the article being cut can be accommodated within the clearance without the article being cut contacting the guide.

2. The saw of claim 1, wherein said saw is configured so that said guide is pivotally moveable between said active position and said inactive position.

3. The saw of claim 1, wherein said saw is configured so that said guide can be moved between said active position and said inactive position without detaching said guide from a body of said saw.

4. The saw of claim 1, wherein said housing has a pair of openings sharing a common axis and wherein said guide includes a pair of opposing pins, the openings receiving said pins for pivotal mounting of said guide on said housing.

5. The saw of claim 1, wherein said guide is pivotally arranged on said saw in such manner that an angle between said guide and an axis of said elongated saw blade remains constant as said saw is moved between various orientations.

6. The saw of claim 1, wherein said guide has a pair of arms terminating in a said blade limiting assembly, the blade limiting assembly having a pair of surfaces limiting lateral movement of said elongated saw blade when said guide is in said active position.

7. The saw of claim 1, wherein said guide has a pair of arms extending to define a pair of arches and terminating in a blade limiting assembly, the blade limiting assembly having a pair of surfaces limiting lateral movement of said elongated saw blade, when said guide is in said active position.

8. The saw of claim 1, wherein said saw is configured so that when said guide is in said active position said blade limiting assembly surrounds said elongated saw blade at a position that is more proximate said distal end than said proximal end.

9. The saw of claim 1, wherein said housing of said saw has a formation configured to accommodate said guide when said guide is in said inactive position.

10. The saw of claim 1, wherein said guide is attached to a saw body provided by said housing.

11. The saw of claim 1, wherein said guide is attached to a saw body with use of an adapter.

12. A guide for guiding an elongated saw blade of a saw having a major body and the elongated saw blade extending from the major body, said guide comprising:
a blade limiting assembly having a pair of opposing surfaces for limiting lateral movement of said elongated saw blade;
wherein said guide is configured to be mounted to a body of a saw; and
wherein said guide is further configured so that said guide can be moved from an active position wherein said blade limiting assembly surrounds said elongated saw blade to limit lateral movement of said elongated saw blade, wherein the blade limiting assembly is adapted for limiting lateral movement of the elongated saw blade when the guide is in said active position, the blade limiting assembly being adapted to surround the elongated saw blade at a position spaced from the major body when the guide is in said active position, wherein the guide is adapted to define a clearance between the guide and the elongated saw blade, the guide being adapted to include a first arm and a second arm extending forwardly from the major body and delimiting the clearance, the guide being adapted so that the first arm and the second arm are spaced apart from one another in a manner that that the first arm and the second arm are disposed on opposite sides of a vertically extending plane extending coextensively with and encompassing the saw blade the guide being adapted so that the clearance has a height greater than a height of the elongated saw blade, the guide being configured so that during cutting at least a portion of the article being cut can be accommodated within the clearance without an article being cut contacting the guide.

13. The guide of claim 12, wherein said guide is configured so that said guide is pivotally moveable between said active position and an inactive position.

14. The guide of claim 12, wherein said guide is configured so that said guide can be moved between said active position and an inactive position without detaching said guide from a body of said saw.

15. The guide of claim 12, wherein said guide includes a pair of opposing pins for pivotal mounting of said guide to an external body.

16. The guide of claim 12, wherein said guide is adapted to be pivotally arranged on said saw in such manner that an angle between said guide and an axis of said elongated saw blade remains constant as said saw is moved between various orientations.

17. The guide of claim 12, wherein said guide has a pair of arms terminating in a blade limiting assembly, the blade limiting assembly having a pair of surfaces adapted to limit lateral movement of said elongated saw blade when said guide is in said active position.

18. The guide of claim 12, wherein said guide has a pair of arms extending to define a pair of arches and terminating in a said blade limiting assembly, the blade limiting assembly having a pair of surfaces adapted to limit lateral movement of said elongated saw blade when said guide is in said active position.

19. The guide of claim 12, wherein said guide is configured so that when said guide is in said active position said blade limiting assembly surrounds said elongated saw blade at a position that is more proximate a distal end of said elongated saw blade than a proximal end of said elongated saw blade.

20. The guide of claim 12, wherein said guide is configured to be accommodated within a formation of said saw when said guide is in an inactive position.

21. The guide of claim 12, wherein said guide is adapted to be attached to a saw body provided by a housing.

22. The guide of claim 12, wherein said guide is adapted to be attached to a saw body with use of an adapter.

23. The guide of claim 12, wherein said guide, at a region of said guide having guide surfaces for limiting lateral movement of the elongated saw blade, includes a width that is wider than a maximal width of the elongated saw blade.

24. The guide of claim 12, wherein said guide includes a region having a width wider than a maximum width of a housing of the saw.

25. The guide of claim 12, wherein the guide is configured so that the guide is biased toward the active position by gravity.

26. The saw of claim 1, wherein the saw is configured so that during cutting while said guide is in said active position at least a portion of the article being cut can be accommodated within the clearance without the article being cut contacting the guide.

27. The guide of claim 12, wherein the guide is configured so that during cutting while said guide is in said active position at least a portion of the article being cut can be accommodated within the clearance without the article being cut contacting the guide.

28. A saw for cutting an article, said saw comprising:
an elongated saw blade having a proximal end and a distal end;
a driver assembly for moving said elongated saw blade;
a housing encapsulating said driver assembly; and
a guide for guiding said elongated saw blade, the saw being configured so that said guide is moveable between an active position and an inactive position, the guide in said active position limiting lateral movement of said elongated saw blade, the guide in said inactive position not limiting lateral movement of said elongated saw blade, wherein said saw is configured so that said guide, when encountering a force imparted by said article during cutting while said guide is in said active position, is capable of moving from said active position to permit continued cutting of said article after said article is contacted by said guide during cutting, wherein the guide includes a blade limiting assembly for limiting lateral movement of the elongated saw blade when the guide is in said active position, the blade limiting assembly surrounding the elongated saw blade at a position spaced from the housing when the guide is in said active position, wherein the guide defines a clearance between the guide and the elongated saw blade, the guide including a first art and a second arm extending forwardly from the housing and delimiting the clearance, the guide being adapted so that the first arm and the second arm are spaced apart from one another in a manner that that the first arm and the second arm are disposed on opposite sides of a vertically extending plane extending coextensively with and encompassing the saw blade, the clearance having a height greater than a height of the elongated saw blade, the saw being configured so that during cutting at least a portion of the article being cut can be accommodated within the clearance without the article being cut contacting the guide.

29. A guide for guiding an elongated saw blade of a saw having a major body and the elongated saw blade extending from the major body, said guide comprising:
a blade limiting assembly having a pair of opposing surfaces for limiting lateral movement of said elongated saw blade;
wherein said guide is configured to be mounted to a body of a saw; and
wherein said guide is further configured so that said guide can be moved from an active position wherein said blade limiting assembly surrounds said elongated saw blade to limit lateral movement of said elongated saw blade, wherein the blade limiting assembly is adapted for limiting lateral movement of the elongated saw blade when the guide is in said active position, wherein the blade limiting assembly includes first and second opposing members that are adapted to be spaced to a lateral spacing distance greater than a width of the blade, the blade limiting assembly being adapted to surround the elongated saw blade at a position spaced from the major body when the guide is in said active position, wherein the guide is adapted to define a clearance between the guide and the elongated saw blade, the guide being adapted so that the clearance has a height greater than a height of the elongated saw blade, the guide being configured so that during cutting at least a portion of an article being cut can be accommodated within the clearance without the article being cut contacting the guide.

30. The saw of claim 28, wherein said saw is configured so that said guide is pivotally moveable between said active position and said inactive position.

31. The saw of claim 28, wherein said guide has a pair of arms terminating in said blade limiting assembly, the blade limiting assembly having a pair of surfaces limiting lateral movement of said elongated saw blade when said guide is in said active position.

32. The saw of claim 28, wherein said saw is configured so that when said guide is in said active position said blade limiting assembly surrounds said elongated saw blade at a position that is more proximate said distal end than said proximal end.

33. The saw of claim 28, wherein said housing of said saw has a formation configured to accommodate said guide when said guide is in said inactive position.

34. The saw of claim 28, wherein the saw is configured so that during cutting while said guide is in said active position at least a portion of the article being cut can be accommodated within the clearance without the article being cut contacting the guide.

35. The guide of claim 29, wherein said guide is configured so that said guide is pivotally moveable between said active position and an inactive position.

36. The guide of claim 29, wherein said guide has a pair of arms extending to define a pair of arches and terminating in said blade limiting assembly, the blade limiting assembly having a pair of surfaces adapted to limit lateral movement of said elongated saw blade when said guide is in said active position.

37. The guide of claim 29, wherein said guide is configured so that when said guide is in said active position said blade limiting assembly surrounds said elongated saw blade at a position that is more proximate a distal end of said elongated saw blade than a proximal end of said elongated saw blade.

38. The guide of claim 29, wherein the guide is configured so that during cutting while said guide is in said active position at least a portion of the article being cut can be accommodated within the clearance without the article being cut contacting the guide.

* * * * *